Sept. 13, 1938. R. K. POTTER Re. 20,859

ELECTRIC CIRCUIT ARRANGEMENT

Original Filed Jan. 19, 1933 3 Sheets-Sheet 1

INVENTOR
R. K. Potter
BY William R. Baccard
ATTORNEY

ELECTRIC CIRCUIT ARRANGEMENT

Original Filed Jan. 19, 1933 3 Sheets-Sheet 2

INVENTOR
R. K. Potter
BY William R. Ballard
ATTORNEY

ELECTRIC CIRCUIT ARRANGEMENT
Original Filed Jan. 19, 1933 3 Sheets-Sheet 3
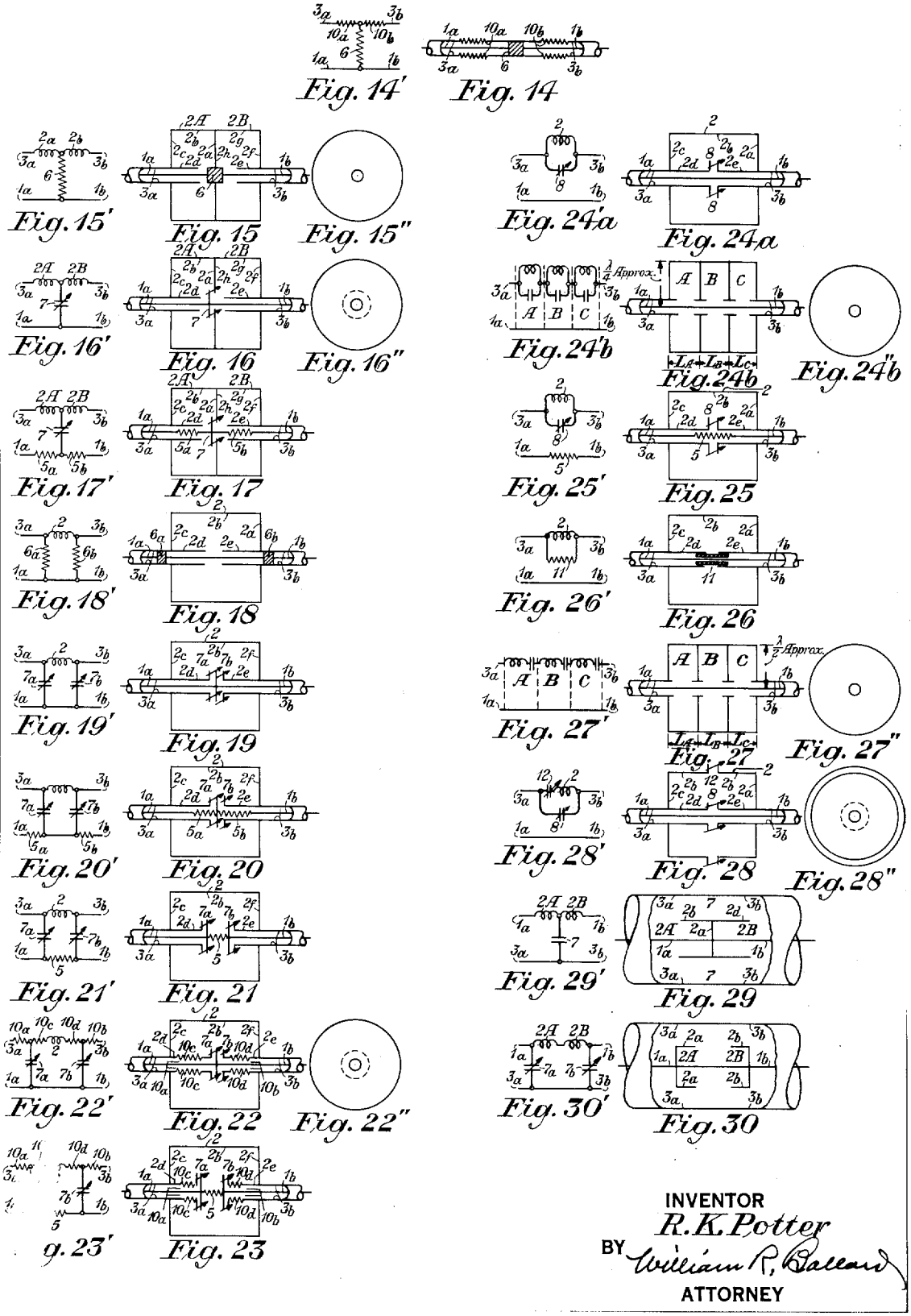
INVENTOR
R. K. Potter
BY William R. Ballard
ATTORNEY Reissued Sept. 13, 1938

Re. 20,859

UNITED STATES PATENT OFFICE 20,859

ELECTRIC CIRCUIT ARRANGEMENT

Ralph Kimball Potter, Madison, N. J., assignor to American Telephone and Telegraph Company, a corporation of New York Original No. 2,030,178, dated February 11, 1936, Serial No. 652,556, January 19, 1933. Application for reissue October 16, 1937, Serial No. 169,520

39 Claims. (Cl. 178—44)

This invention relates to an electrical inductive element, adaptable to concentric conductor transmission lines, the physical dimensions of which are not necessarily related to the wave length of oscillation and in which the currents and potentials may be distributed symmetrically about an axis.

In the following description there is disclosed in detail the functioning of this inductive device and arrangements of this inductive device in combinations with capacitive and resistive elements to form terminating, oscillatory and translation circuits.

The various arrangements of the electrical circuit elements may be classified into three groups: First, the terminating circuits, second, the oscillatory circuits and third, the translation circuits which may be further classified into simple series circuits, T networks, pi networks and series arrangements of parallel or anti-resonant circuits.

In the drawings, Figure 1*a* illustrates a simple concentric conductor circuit; Figs. 1*b*, 1*c* and 2 illustrate forms of the inductive device of the present invention; Figs. 3*a* to 5 inclusive illustrate various combinations of the inductive device with other circuit elements such as resistances and capacities to forms terminating circuits for concentric conductors; Figs. 6*a* to 13 inclusive illustrate various combinations of inductive devices, resistances and capacity elements to form oscillatory types of circuits for concentric conductor systems; Figs. 14 to 17 inclusive show translation circuits of the T type; Figs. 18 to 23 inclusive show pi type translation circuits; Figs. 24*a* to 26 inclusive show parallel or anti-resonant types of translating circuits; Figs. 27 to 30 inclusive illustrate still other forms of translating circuits; Figs. 2′ to 30′, inclusive, designate simplified electrical diagrams equivalent to the arrangement shown in Figs. 2 to 30, inclusive; while Figs. 2″, 3*a*″, 3*b*″, 6*b*″, 8″, 15″, 16″, 22″, 24*b*″, 27″ and 28″ are end views to show the cross-sectional shape of the enclosing vessels. Also, Figs. 2‴, 5‴, 8‴ and 13‴ are enlarged diagrams with more indication of structure, these figures corresponding to Figs. 2, 5, 8 and 13 respectively.

An important feature of the inductive element disclosed in this application is that its longitudinal dimensions are not directly related to the wave length of oscillation. Fig. 1*a* illustrates a section of concentric conductors short-circuited at the far end and of a length Lλ. It is readily apparent that the input impedance Z of this section is a function of the length as the constants of the circuit are distributed smoothly along the circuit. In Fig. 1*b* is shown the inductive element of this invention, the functioning of which will be described later in more detail. In this structure the constants of the concentric conductor circuit may be obtained in greater magnitude; thus the physical dimensions of the enclosing vessel, which is large in comparison with the concentric conductors, may be so chosen as to result in the input impedance Z′ being equal to Z, but Z′ is not necessarily a function of the physical length of the element (L′λ).

The proportionality of the various dimensions of the inductive element is variable. Fig. 1*c* illustrates an inductance element in which the radius of the enclosing vessel (assuming a hollow circular cylinder) is large in comparison with its length.

The manner in which the enclosing vessel functions as an inductance will now be described in detail. The inductive device is illustrated in Fig. 2 and somewhat more in detail in Fig. 2‴. To the left of Fig. 2 is shown the equivalent electrical circuit. This device consists of two concentric conductors 1 and 3 projecting into a closed cylindrical vessel 2 of conducting material which forms the reactive element. This cylindrical vessel or "tank", as it will henceforth be called, is coaxial to the concentric system, the central conductor of which makes contact with the center of the opposite face 2*a* of the enclosure, while the external conductor which projects some distance into the tank is connected to the near or left-hand face 2*c*. The size of this tank and the relative distance that this outer conductor, section 2*d*, projects into the tank are the determining factors of the amount of inductance obtainable from the tank circuit.

The path that the radio-frequency current takes in this circuit is as follows. Let it be assumed that the wave coming down the concentric conductor is such at the instant under discussion that current flows to the right on the inner conductor 1 and to the left on the inner surface of the outer conductor 3, as indicated by the two arrows at 100 in Fig. 2‴. When the current on 1 reaches the end of this conductor, it will flow outward along the face of the cylindrical enclosure 2*a*, then to the left on the inner side of the walls of the tank 2*b*, inward on the inner side of the left-hand face 2*c*, to the projecting section of conductor 3, which is labeled 2*d*, to the right along the outer surface of 2*d* to its end and thence to the inner surface of 3 and to the left. The currents at all these different points will not necessarily be exactly in the same place. In a high frequency conductor pair the average motion of the electrons at any one place along the conductor pair is oscillatory and this motion is wave-like in progression along the length of the conductor.

The current which followed the path described above, around the interior surfaces of the cylindrical vessel, will be seen to have flowed as a current sheet which formed the surface of something resembling a toroid. The magnetic field associated with this current would consist of circular lines of force lying within the vessel, concentric to the concentric tube conductor and coaxial with it. It is evident that the inductive effects of this current with its associated magnetic field represent the inductive element of the equivalent circuit.

It is also evident that there will be certain distributed capacity effects in this structure, for example, the capacity between the internal surface of the terminating vessel and the external surface of the concentric tube structure projecting into it. These stray capacities will, in general, be of the same character as the distributed capacity in an ordinary inductance coil and will be minimized to the extent that the physical dimensions of the system are small in comparison with the wave length of the currents involved. Therefore, the exactness with which true capacities and true inductances can be simulated will be subject to the same difficulties as are involved with ordinary coils and condensers, although they may be of a different order of magnitude.

While several ways of viewing the transfer of energy through the device of this invention are permissible, if one looks at the phenomenon in terms of a flow of current, then the action of the device may be understood more clearly by pointing out that the tank cylinder 2 and conductor 1 act effectively as a one-turn toroid of rectangular cross-section in which, as previously stated, the current may be considered as entering on conductor 1, spreading out radially over the remote disc end, passing longitudinally along the inner surface of 2, coming in radially on the inner surface of the other disc end, flowing on the outer surface of the portion **2*d* towards the right, and then flowing to the left on the inner surface of 2*d* and continuing on the inner surface of 3**. This sets up a magnetic field entirely enclosed in the tank and introduces an inductance the value of which can be obtained approximately from a well known formula for the inductance of a toroid of rectangular cross-section. Among other places, this formula is given in Bureau of Standards Circular No. 74, page 251, as:

$$L=.004606n^2h\log_{10}\frac{r_2}{r_1}$$

in which L is expressed in microhenries, $n$ is the number of turns (in this case, one), $h$ is the inside length of the tank, $r_1$ is the radius of the inside conductor and $r_2$ is the inside radius of cylinder 2.

As an illustration, we may take $h=100$ centimeters, $r_1=.25$ centimeters and $r_2=50$ centimeters, whereupon calculation readily shows that L=1.06 microhenries. It will be evident from the formula that a wide variety in the length and radial dimensions of the tank circuit will provide the same value of inductance L.

The extent to which conductor 3 extends into the tank has an effect on the constants of the circuit, but precise formulae therefor are not available. In general, however, if one considers the transmission line as including the portion **2*d* and terminating at the end thereof, then the inductance of the tank circuit is approximately proportional to the area of the longitudinal cross-section of the tank reduced by the area of the longitudinal cross-section of the portion of the transmission line extending into the tank. Thus it is seen that lengthening the portion of the conductor 2*d* decreases the inductance of the device to a small extent. Another consideration in this connection, however, is the degree of coupling between the transmission line on the one hand and the tank circuit on the other, the said coupling being determined by the extent to which the conductor 2*d* extends into and covers the conductor 1**. With the outer conductor barely entering the tank the full inductance of the tank is common to both the line and the tank circuit, and thus the coupling is a maximum. If the whole of the inner conductor is covered by the outer conductor it is obvious that no energy can be transferred from the inner conductor to the tank circuit and thus the coupling is zero. For a partial covering of the inner conductor a portion only of the tank inductance is common to both circuits and the coupling takes on an intermediate value. Furthermore, to obtain impedance matching between the two circuits a particular value of coupling is necessary, and this corresponds to a particular length of uncovered portion. It is thus seen that adjustment of the uncovered length is important for the most effective functioning of this device in its circuit. For the high frequencies contemplated here it develops that the impedance of the tank circuit is usually very much greater than the impedance of the transmission line to which it is to be attached. For proper impedance matching, then, the coupling should be quite small, and this is accomplished by having only a small portion of the inner conductor exposed. Various means by which the amount of inner conductor uncovered, and therefore the degree of coupling, can be altered, are shown in Figures 5‴, 8‴ and 13‴, but obviously many other methods will suggest themselves to those skilled in the art.

It should be emphasized again that the use of the tank circuit is not dependent upon the frequency to be impressed upon the line and that, in fact, the value of the inductance, as calculated, will be substantially independent of frequency so long as the wave length corresponding thereto is large compared to the dimensions of the parts of the device. In certain cases, however, as in Figure 3*b*, some of the dimensions may approach those of the wave length or be simply related thereto, in which event certain special results are obtained.

Fig. 3*a* illustrates the means of obtaining a capacity and an inductance in series. This arrangement consists of two concentric conductors 1 and 3 projecting into a closed cylindrical vessel of conducting material, entering at the center of one of the cylinder faces and perpendicular to it. The inner conductor fans out into a disc close to the opposite wall making one plate of a condenser; the wall serving as the other plate. The size of this disc and the spacing between it and the wall of the enclosing vessel determine to a great extent the magnitude of the capacity of this series condenser. In the illustrations that follow the capacity element will be designated as being adjustable. However, it is to be understood that the type of this capacity, either fixed or variable, is optional.

Assuming that the direction of current flow at a particular instant is such as to be to the right on the inner conductor and to the left on the inner surface of the outer conductor of the concentric conductor system, the current on the inner conductor then travels to the disc which is one plate of condenser 4. Here it passes as a displacement current through the condenser to the opposite face 2*a*, thence outward along the inner surface of the tank 2 to the inner surface of conductor 3 in the same manner as described above. The type of dielectric used in this condenser is optional.

In Fig. 3*a* the series condenser 4 is shown as being variable. It is, therefore, evident that this circuit may become a series resonant circuit. However, a simpler method of obtaining a series resonant circuit without the use of the series condenser, is illustrated in Fig. 3*b*. Herein is applied the knowledge of the property of a transmission line short-circuited at one end and of a length equal to a half-wave. The input impedance of such a line is very low (substantially zero). In Fig. 3*b* the inner surface of the two end walls of the "tank" are considered the two sides of the circuit and the circular wall the shorting element. The radius of this enclosing vessel, which is large in comparison to the length L of the structure, is made approximately equal to a half-wave. Theoretically this dimension should be a half-wave; however, due to end effects this length is usually a little shorter than a half-wave.

Fig. 4 illustrates an arrangement of inductance and resistance in series. The resistance in this arrangement may be either in the inner conductor or the outer conductor. If placed in the inner conductor it may consist of a graphite rod; if placed in the outer conductor, as illustrated in Fig. 14, it may consist of a hollow cylinder of any suitable resistance material.

Figs. 5 and 5''' illustrate a series arrangement of resistance 5, capacity 4 and inductance 2. As mentioned above the resistance element may be in either the inner or the outer conductor. A series resistance may also be inserted in either conductor of the tuned circuit of Fig. 3*b*. The impedance of this arrangement would be a pure resistance equal to the magnitude of the series resistance at a particular frequency. The capacity of the condenser 4 may be adjusted by sliding the vessel 2 longitudinally, thus varying the spacing between the two plates of this condenser. For this purpose, as shown in Fig. 5''', a sliding connection is provided at 102 for the vessel 2 on the outer concentric conductor shell 3 and a handle by which to make this adjustment is shown at 101.

Fig. 6*a* illustrates the arrangement of a capacity and an inductance in parallel to form an oscillatory circuit. In this arrangement the oscillation energy is confined to the interior of the "tank" circuit. The arrangement consists of two concentric conductors 1 and 3 which project into a closed cylindrical vessel 2 of conducting material, entering at the center of one of the cylinder faces 2*c* and perpendicular to it. The central conductor of the concentric system makes contact with the center of the opposite face 2*a* of the tank 2 while the external conductor fans out into a disc close to this opposite wall, making one plate of the condenser 7, the other plate of which is the opposite face of the enclosing vessel.

Let it be assumed that the wave is traveling over the concentric conductor system in such a direction at the instant under discussion that current flows to the right on the inner conductor 1 and to the left on the inner surface of the outer conductor 3. When the current on the inner conductor 1 reaches the end of the conductor, it will flow out onto face 2*a* of the cylindrical enclosure and part of it will return as displacement current through the condenser formed between this face and the fanned out end of the external conductor 3 to the inner surface of 3 and thence to the left. The remaining portion of current will follow a path to the left around the interior surface of tank 2 and then to the right on the outer surface of the portion of the outer conductor which projects into the tank. This surface is labeled 2*d*. When this portion of the current reaches the flange on the end of 2*d* it joins that portion of the current which is flowing through the condenser as a displacement current. The value of the capacity of condenser 7 is a function of the size of the flange and the spacing between it and the opposite wall of the tank. As in the case of the series condenser in Fig. 3*a*, the dielectric used in this condenser is optional.

In Fig. 6*a* the shunt condenser 7 is shown as being variable. It is, therefore, evident that this circuit may become a parallel anti-resonant circuit. Again applying transmission line theory to this device an equivalent anti-resonant circuit, simulating a short-circuited transmission line a quarter-wave in length, can be obtained. This arrangement, illustrated in Fig. 6*b*, is similar to that illustrated in 3*b* with the exception that the radius of the enclosing tank, which is large in comparison with the length, is made approximately equal to a quarter-wave. As explained in reference to Fig. 3*b*, the dimension is slightly less than the theoretical dimension because of end effects. The impedance of the circuit is very high for the frequency corresponding to wave $\lambda$.

Fig. 7 illustrates a parallel arrangement of resistance and inductance. The inductance element is the tank circuit described above. The shunt resistance element 6 is a hollow circular cylinder of suitable resistance material lying coaxially between the inner and outer conductors and making contact with both. The thickness of this hollow cylinder is equal to the difference between the inner radius of the outer conductor and the radius of the inner conductor. The position of this resistance affects only the amount of lead resistance between the point at which it shunts the circuit and the other elements of the circuit. It may be advantageous from a construction viewpoint to place it in that portion of the concentric conductor system which is enclosed by the tank, preferably near the end of the projecting coaxial conductors. Current will flow across and through this resistance in a radial direction.

Figs. 8 and 8''' illustrate an arrangement of inductance, capacity and resistance in parallel. This arrangement is a combination of the arrangements illustrated in Figs. 6*a* and 7. The vessel 2 can be displaced longitudinally in relation to the parts of the concentric conductor system 1—3, for which purpose a sliding joint is shown at 102 and another sliding joint at 103. This displacement can be made by means of the handle 101. By such displacement the plates of the condenser 7 are spaced more or less apart and thereby the capacity of the condenser is adjusted accordingly.

Fig. 9 illustrates the series arrangement of a capacity 4 and an inductance 2 shunted with a resistance 6. The arrangement is a combination of the arrangements illustrated in Figs. 3a and 7.

Fig. 10 illustrates the parallel arrangement of resistance and inductance in series with a capacity 8. In this arrangement the capacity is obtained by inserting a gap in the outer conductor of the concentric conductor system and attaching flanges or hollow circular discs to the two adjacent ends. The capacity of this condenser may be varied by changing the size of the flanges or their spacing. The series capacity shown in the outer conductor of Fig. 10 could with equal effectiveness be inserted in series with the inner conductor opposite point 8.

Fig. 11 illustrates a parallel arrangement of capacity and inductance in series with a resistance. The resistance consists of some suitable material such as a graphite rod in series with the inner conductor 1. This resistance can also be placed in the outer conductor. In this arrangement the resistance element would be tubular in construction, as illustrated in Fig. 14, and the current would flow along the inner surface.

Fig. 12 illustrates a series arrangement of resistance 5 and inductance 2 shunted by a capacity 7. This arrangement differs from that in Fig. 11 in that the shunting capacity 7 is placed ahead of the resistance 5. Current traveling to the right along conductor 1 flows outward on the disc which comprises one plate of condenser 7. Part of the current passes through the gap as displacement current to the flange attached to the projection of conductor 3 and thence to the left on the inner surface of conductor 3. The remainder of the current flows around the disc and to the resistance 5, then through the inductance 2 in the manner described above, back along 2d to the inner face of the flange of condenser 7 where it joins that portion of the current which is flowing through condenser 7 as displacement current.

Figs. 13 and 13''' illustrate a series arrangement of capacity 4 and inductance 2 shunted by another capacity 7. This arrangement is a combination of the elements of the circuits illustrated in Figs. 3a and 6a. This arrangement is obtained by adding a flange to the end of the section of the outer conductor, which projects into the tank, near the disc which is attached to the end of the inner conductor. Thus current flowing to the right on the inner conductor divides at the disc, part of it flowing across to the flange, condenser 7, to the inner surface of conductor 3 and the remainder flowing as displacement current through the series condenser 4 around the inductance element and thence to the inner surface of conductor 3. Each of the two capacities 7 and 4 can be adjusted independently of the other. The vessel 2 is longitudinally displaceable by virtue of a sliding connection at 102. This displacement may be made by means of the handle 101. Also, the intermediate plate which is common to both condensers 7 and 4 is mounted with a sliding connection at 104 on the end of the axial conductor 1. It can be displaced in and out by means of the handle 105.

A simple T network consisting of resistance elements is illustrated in Fig. 14. Assume that the current flow at a particular instant is to the right on the inner conductor and to the left on the inner surface of the outer conductor. Current on 1a travels to the hollow cylindrical resistance 6 where part of it leaks across to the inner surface of the outer conductor where it passes to the left across the resistance 10a. The remaining portion continues to the right to the terminating circuits and on returning on 3b flows across the resistance 10b, then to 6 where it joins that portion which is flowing through 6, thence across 10a and to the left along the inner surface of 3a.

In Fig. 15 the series resistances of Fig. 14 have been replaced by inductances. This arrangement is obtained by placing two tanks, illustrated in Fig. 2, back to back and continuing the central conductor through the two tanks. Current traveling to the right on 1a reaches the hollow cylindrical resistance 6, where part of it leaks across to the left-hand face of the central partition 2a, thence around the interior of tank 2A to the inner surface of the outer conductor 3a where it proceeds to the left. The remainder of the current flows along 1b and returns on 3b, where it passes around the interior of tank 2B, by the way of 2e, 2f, 2g and 2h, thence to face 2a and around the interior of tank 2A with that portion of the current that is flowing across resistance 6.

In Fig. 16 the shunt resistance of Fig. 15 has been replaced by a condenser 7. This condenser is made by attaching a disc to conductor 1a near the central partition of the double tank. Part of the current which is assumed to be traveling to the right on conductor 1a passes through condenser 7 to the face 2a as displacement current and along the interior of tank 2A and then to the left on the inner surface of conductor 3a. The remainder of the current travels along 1b to the terminating circuits and back along the inner surface of 3b, then around the interior of tank 2B to face 2a of tank 2A, where it joins the current that is flowing as displacement current through condenser 7.

Fig. 17 illustrates the manner in which resistances may be added in series with one side of the circuit. Resistance may be added in series with the inductances by inserting hollow cylindrical resistances in conductors 3a and 3b.

Arrangements of the elements of this invention to obtain pi networks are illustrated in Figs. 18 to 23 inclusive. In Fig. 18 an arrangement consisting of an inductance in one side of a line with two resistances shunting the line, one each side of the inductance, is illustrated. This arrangement differs from that of Fig. 2 particularly in that the concentric conductor enters the enclosing vessel or tank 2 at each end wall thereof, the inner conductor, however, extending entirely through the tank. In Fig. 18 also, resistances 6a and 6b are added, which may be in the form of hollow cylinders enclosing the inner conductors 1a and 1b extending to the outer conductor 3a or 3b as the case may be.

This arrangement functions as follows:

If the current is flowing toward the right on conductor 1a, part of the current passes through the resistance 6a to the conductor 3a. Part of the current also flows over the inner conductor to the resistance 6b where it again divides, part of the current flowing through the resistance 6b to the outer conductor 3b and part of the current passing over the inner conductor to some distant point and thence returning on the inner surface of the outer conductor 3b, where it joins with the current through the resistance 6b to flow to the inner end of the inner surface of the outer conductor 3b, and thence over the outer surface 2e, then over the inner surfaces 2a, 2b and 2c of the enclosing vessel or tank 2, thence over the outer surface 2d of the outer conductor 3a, and finally over the inner surface of the outer conductor 3a to join the current through the resistance 6a, which then flows on to the left on the inner surface of the outer conductor 3a.

In Fig. 19 the shunt resistances of Fig. 18 have been replaced by shunt condensers. The condensers are formed by attaching flanges to the ends of the two sections of the outer conductors which project into the tank from opposite directions and by attaching a disc to the inner conductor of the concentric conductor system, between these two flanges. Thus each side of the disc forms a plate for one of the condensers.

The operation of the arrangement in Fig. 19 is as follows: Current flowing to the right over conductor 1a divides at the disk associated with the inner conductor, part of the current flowing as a displacement current through the plates of the condenser 7a and thence over the inner surface of the outer conductor 3a to the left. Part of the current flows as a displacement current through the condenser 7b and over the outer surface 2e of the outer conductor 3b to the inner wall 2f of the tank 2. Part of the current also continues over the inner conductor 1b to some distant point and returns over the inner surface of the outer conductor 3b to the end of said outer conductor near the center of the enclosing tank from which point it passes over the outer surface 2e of the outer conductor along with the displacement current previously described. From this point the displacement current and the returning current flow over the inner surfaces 2f, 2b and 2c of the tank 2, over the outer surface 2d of the outer conductor 3a and then over the inner surface of the outer conductor 3a to the left.

Fig. 20 illustrates the manner in which resistance may be inserted in one side of the system. Resistances 5a and 5b are inserted in series with conductors 1a and 1b both sides of the central disc, the sides of which form the corresponding plates of the shunt condenser. Resistance could also be placed in the other side of the circuit by placing hollow cylindrical resistances in sections 3a and 3b of the outer conductor.

Fig. 21 illustrates the manner in which a series resistance may be placed in one side of the circuit between the two shunt condensers. In this arrangement it was necessary to spread the condensers and insert resistance 5. Thus two discs attached to the central conductor are required rather than one as in Figs. 19 and 20. Assume that the current in the system at a particular instant is traveling to the right on the inner conductor 1a. This current reaches the first disc which is part of condenser 7a and divides, part flowing through condenser 7a as displacement current and back to the left on the inner side of conductor 3a, the remainder flowing around the disc and across resistance 5 to condenser 7b. Here again the current divides, part of it flowing as displacement current through condenser 7b, and through the inductance 2 by way of 2e, 2a, 2b, 2c and 2d, to the inner surface of the flange of condenser 7a where it joins the displacement current that is flowing through condenser 7a. The remaining portion flows along 1b to the terminating circuits and returns along 3b to the flange of condenser 7b. Here it joins the displacement current that is flowing through 7b and takes the path described above for that current.

Fig. 22 illustrates an arrangement including resistance in series with the inductance of the pi network. These resistances are in two sections, one each side of the point at which a shunt condenser is attached to that side. The inner and outer surfaces of the hollow cylindrical resistances which are placed in the two sections of the outer conductors which project into the tank constitute the two independent sections of the resistance which is placed each side of the inductances and between whose two sections the shunt condenser is connected.

Referring to Fig. 22 and assuming that the direction of current flow at a particular instant is to the right on the inner conductor and to the left on the inner surface of the outer conductor, the various paths of the current of the system are as follows. Current flowing to the right on 1a reaches the common disc of condensers 7a and 7b. Part of this current flows as displacement current from the left-hand face of the central disc to the flange of 7a, thence to the left along the inner surface of the hollow cylindrical resistance in the left-hand section of the outer conductor and along the inner surface of this outer conductor 3a. The inner surface of this resistance is designated 10a. The remainder of the current flows around the disc to the right-hand face and some of it passes as displacement current through condenser 7b while the remainder travels along 1b. The portion that passes through 7b will flow around the flange and to the right across the outer surface of the hollow cylindrical resistance situated in the right-hand section of the outer conductor which projects into the tank. This outer surface is designated 10d. This portion of the current then passes through the inductance 2 by way of 2e, 2a, 2b, 2c and 2d, to the right across the outer surface of the hollow cylindrical resistance in the left-hand section of the outer conductor, designated 10c, part of this current penetrating to the inner surface 10a and part of it flowing around the flange of 7a where it joins the displacement current that is flowing through 7a, and thence along 10a and 3a. The portion of the current which continues along 1b goes to the terminating circuits and returns to the left along the inner surface of the outer conductor 3b. Part of this current penetrates through the resistance which is situated in the right-hand section of the outer conductor to the outer surface 10d while the remainder flows across the inner surface, designated 10b, to the flange of condenser 7b where it joins the displacement current which is flowing through condenser 7b.

Fig. 23 illustrates the maner in which a resistance may be inserted in one side of the circuit opposite the inductance branch and between the shunting condensers. In this arrangement, as in the one illustrated in Fig. 21, the two condensers 7a and 7b are spread apart and a resistance 5 inserted in the central conductor between the two condensers.

A few fundamental arrangements of parallel elements in series circuits are illustrated in Figs. 24a, 24b, 25, 26 and 28. Fig. 24a illustrates a parallel combination of inductance and capacity connected in one side of a continuous circuit. This parallel circuit may be made anti-resonant by the proper choice of the values of the individual elements.

The circuit of Fig. 24a consists of a concentric conductor system, the outer conductor of which is divided into two sections separated by a small gap. Flanges which consist of circular discs are attached to the adjacent ends of the two sections.

These flanges form the two plates of a condenser. Enclosing this condenser and short sections of the outer conductor both sides of the condenser, and concentric with the conductors, is a closed cylindrical vessel. The functioning of this arrangement is as follows. Assuming the direction of current flow to be such at the instant under discussion that the current is traveling to the right on the inner conductor and to the left on the inner surface of the outer conductor, the current returning to the left on the inner surface of 3b comes to the condenser 8. Here part of it flows across the condenser as displacement current while the remainder flows around the right-hand flange of condenser 8 and around the interior of tank 2, the inductance element, by way of 2e, 2a, 2b, 2c and to the right on 2d. When this portion of the current reaches the left-hand flange of condenser 8, it flows around it to the inner face where it joins with the displacement current flowing through condenser 8 and the total current, from there, flows to the left on the inner surface of the outer conductor 3a.

Another means of obtaining an anti-resonant circuit in series is the arrangement illustrated in Fig. 24*b*. This arrangement is constructed on the same principle as the one illustrated in Fig. 6*b* with the exception that the circuit continues beyond the tank. Fig. 24*b* consists of a plurality of recurrent structures, the radii of which are large in comparison with their length and equal approximately to a quarter wave length at the frequency of oscillation.

These tanks or enclosing vessels may be singular units or may be set up end to end as shown in Fig. 24*b*, in which arrangement the adjacent walls are common.

It is obvious that capacities and resistances similar to those described in reference to preceding figures can be inserted either in series, in shunt or in both arrangements in this circuit.

Fig. 25 illustrates the simple manner in which resistance may be added to one side of the circuit.

Fig. 26 illustrates the means of obtaining an arrangement of inductance and resistance in parallel in a series circuit.

Figure 1:
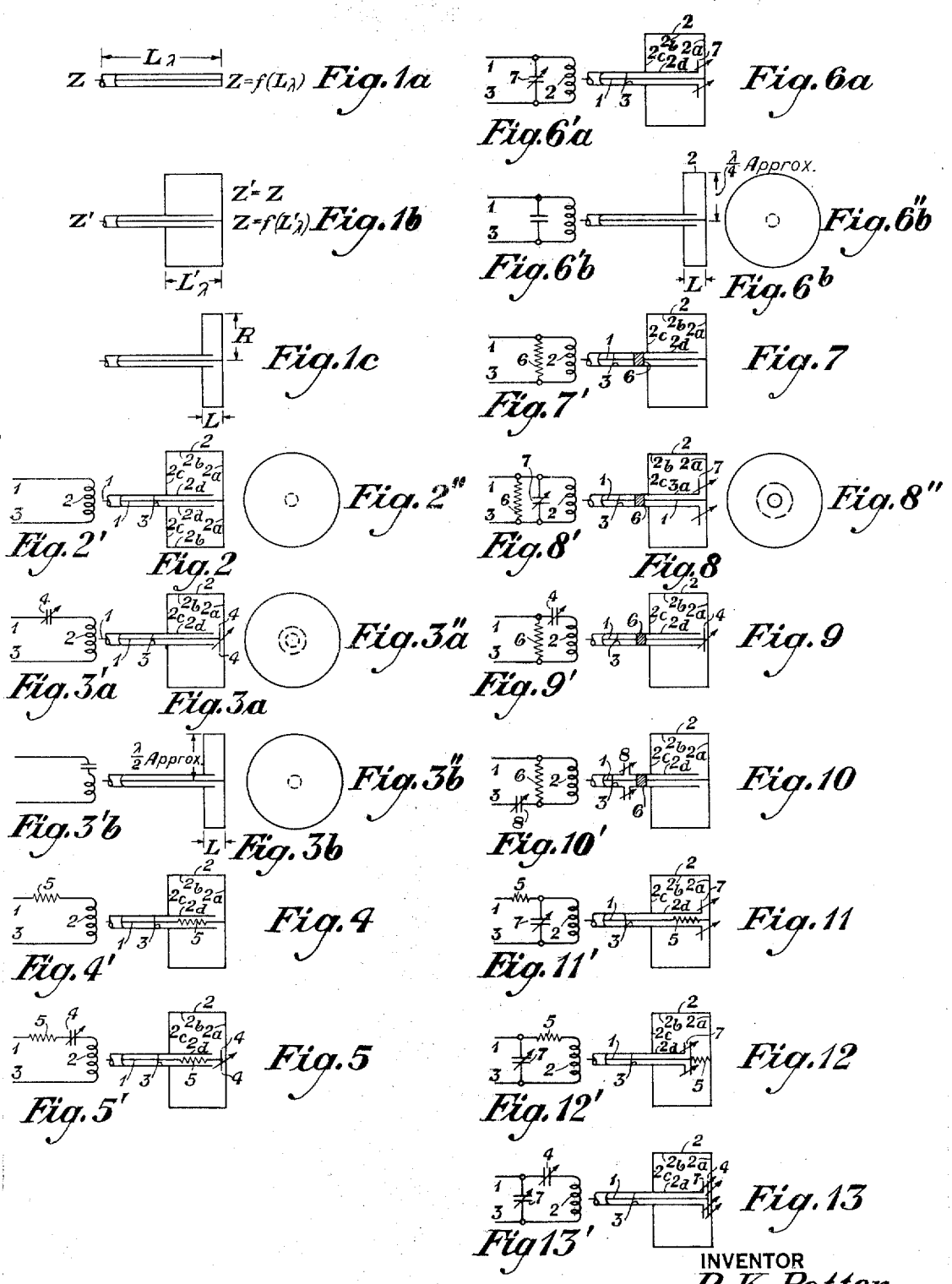
Figure 2:
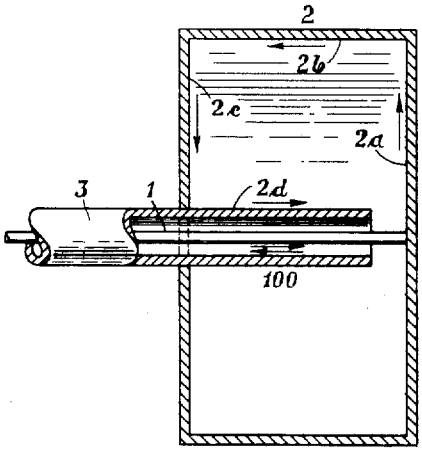
Figure 5:
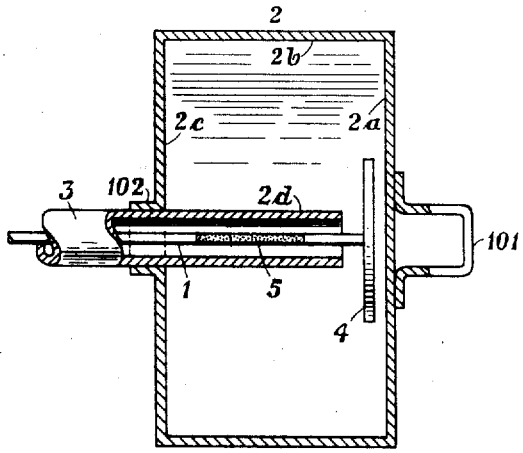
Figure 8:
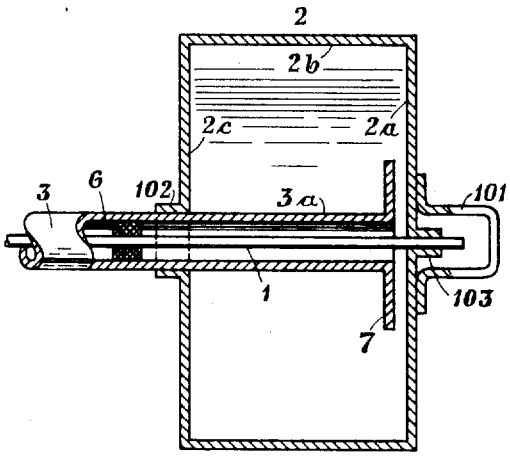
Figure 13:
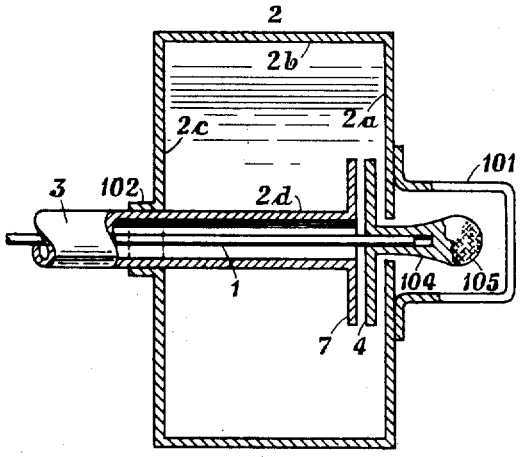

A hollow cylindrical resistance is placed between the two sections of the outer conductor which projects into the tanks and extends some distance into them in such a manner as to permit current flowing to the left on the inner surface of the right-hand section of the outer conductor 3b to divide at the resistance 11, part of it flowing over resistance 11 to the inner surface of the left-hand section of the outer conductor 3a, and the remainder flowing around the interior of tank 2, the inductive element. This hollow cylindrical resistance encloses but does not make contact with the central conductor of the concentric conductor system. The current flows across and through this resistance in a longitudinal direction. A simpler resistance element would be a tubular resistance connected between the ends of the two sections of the outer conductor. Current would leave the inner surface of the outer conductor to flow around the inductance element by penetrating the resistance. A resistive disc placed about the inner conductor, at right angles to it, and connecting to the center of the tubular resistance would result in a circuit similar to the equivalent circuit of Fig. 26, but with the mid-point of the resistance 11 shunted through another resistance to the opposite side of the circuit.

Fig. 27 illustrates a series arrangement of inductance and capacity. The structure of Fig. 27 employs the same principle as that illustrated in Fig. 3*b* with the exception that the circuit continues beyond the tank. Fig. 27 consists of a plurality of recurrent structures, the radii of which are large in comparison with their length and approximately equal to a half wave length at the frequency of oscillation. These tanks or enclosing vessels may be singular units or may be placed end to end as shown in Fig. 27, in which arrangement the adjacent walls are common. As stated in reference to Fig. 24*b*, it is obvious that capacities and resistances similar to those described in reference to preceding figures can be inserted, either in series, in shunt or in both arrangements, in such a structure.

Fig. 28 illustrates a series arrangement of inductance and capacity in series, shunted by another capacity. This circuit differs from that illustrated in Fig. 24*a* in that the tank forming the inductance element has been divided circumferentially into two parts and flanges attached to the adjacent edges to form a condenser. The particular point on the tank at which this is done is of little importance. In Fig. 28 the condenser, as shown, is in the center of the inductive element. In the equivalent circuit at the left, however, the inductance is shown as a single unit.

Although in the above discussion the inductive element was described as a closed hollow cylindrical vessel, it is not intended that this application be limited to this particular system. Any physical system which is symmetrical about an axis could be employed; for example, the enclosing vessel might actually be a toroidal shape rather than a section of a cylinder. The inductance of this tank circuit may be made variable by several methods. The distance that the outer conductor projects into the tank may be made variable by having the tank slip along the outer conductor or by dividing this section of the conductor into two parts, one of which slides into the other. The length of the tank may also be made variable by dividing it into two parts one of which slides into the other.

Various other designs and arrangements of structures, embodying the principle of the enclosing vessel, are possible. For example, in Fig. 29 is illustrated a simple T network composed of series inductances and a shunt capacity. This circuit consists of two concentric conductors and a hollow circular cylinder which encircles the inner conductor, lies wholly within the outer conductor and is coaxial to the concentric conductor system. This cylinder is connected to the inner conductor by a circular disc which lies in a plane perpendicular to the axis of the system and intersects the inner wall of the enclosing cylinder. This disc which completely fills the cross-sectional area between the inner conductor and the enclosing cylinder, divides the interior of the cylinder into two parts. The relative position of this dividing disc within the cylinder determines the relative inductance in each of the two elements. Aside from the difference in physical location of the inductive element in relation to the conductors, this arrangement differs from that illustrated in Fig. 16 in that only a part of a tank is used for each inductive element and the shunt capacity is provided by the capacity between the wall of the cylinder and the inner surface of the outer conductor.

Current flowing to the right on conductor 1a flows through the inductance 2A in the following manner, outward on 2a and then to the left on 2b. The current then flows to the outside of the cylinder. Here part of it flows as displacement current to the inner surface of the outer conductor 3a, the remainder passes through inductance 2B by flowing to the left on surface 2d, then inward on 2e, thence to the right on 1b.

By rearranging this device and by combining with other elements it is possible to duplicate practically all the above circuits. For example, a pi network consisting of a series inductance and two shunt capacities can be obtained by turning the inductance elements about so that the open ends of the tanks face each other as illustrated in Fig. 30. This circuit is similar to the one illustrated in Fig. 19. In this arrangement, as in the preceding one, the shunt capacity is the capacity between the outer surface of the tanks and the inner surface of the outer conductor.

In the above discussion I have shown means of obtaining inductance, capacity and resistance in a concentric conductor system. I have also shown how these elements can be combined to give simple, series and parallel, terminating and oscillatory circuits, translation circuits, including simple series circuits, T networks and pi networks and series arrangements of parallel or anti-resonant circuits. Numerous other circuits, obtainable by various arrangements of the elements of this invention, will be apparent to those skilled in the art. A great many of the various filter combinations known to the transmission art can be obtained by proper combinations of the above circuits. These circuit elements may also be used in oscillator and amplifier circuits.

What is claimed is:

1. In a concentric conductor system in which an inner conductor is surrounded by a cylindrical conductor concentric therewith and acting as a return therefor, an electrical arrangement for association therewith and having the electrical properties of an inductance, said arrangement including a conductive enclosure surrounding at least one of the conductors and concentric therewith, the outer conductor extending into said enclosure a substantial part of its length, said enclosure having a diameter large as compared with the conductor it surrounds and having a length independent of the wave length of the alternating current transmitted, and the interior conductive surface of said enclosure forming a conductive part of the path for the transfer of wave energy from one conductor to the other.

2. In a concentric conductor system in which an inner conductor is surrounded by a cylindrical conductor concentric therewith and acting as a return therefor, an electrical arrangement for association therewith and having the electrical properties of an inductance, said arrangement including a conductive enclosure surrounding said conductors and concentric therewith, the outer conductor extending into said enclosure a substantial part of its length, said enclosure having a diameter large as compared with the outer concentric conductor and having a length independent of the wave length of the alternating current transmitted, and the interior surface of said enclosure forming a conductive part of the path for the transfer of wave energy from one conductor to the other.

3. In a concentric conductor system in which an inner conductor is surrounded by a cylindrical conductor concentric therewith and acting as a return therefor, an electrical arrangement for association therewith and having the properties of an inductance, said arrangement including a closed vessel enclosing and coaxial with the ends of the two concentric conductors, the outer conductor extending into said enclosure a substantial part of its length, the inner conductor being electrically associated with the opposite end of the enclosing vessel, and the other end of said vessel closing on the outer conductor.

4. In a concentric conductor system in which an inner conductor is surrounded by a cylindrical conductor concentric therewith and acting as a return therefor, an electrical arrangement for association therewith and having the properties of an inductance and a capacity, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, and a flange on the end of one of the concentric conductors, said flange being parallel with the first mentioned end of said enclosing vessel and forming a capacity with a nearby conductive surface.

5. In a concentric conductor system in which an inner conductor is surrounded by a cylindrical conductor concentric therewith and acting as a return therefor, an electrical arrangement for association therewith and having the properties of an inductance and a capacity, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, and a flange on the end of the inner concentric conductor, said flange being parallel with the first mentioned end of said enclosing vessel and forming a capacity with a nearby conductive surface.

6. In a concentric conductor system in which an inner conductor is surrounded by a cylindrical conductor concentric therewith and acting as a return therefor, an electrical arrangement for association therewith and having the properties of an inductance and a capacity, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, and a flange on the end of one of the concentric conductors, said flange being parallel with and close to the inner surface of the first mentioned end of said enclosing vessel to form a capacity therewith.

7. In a concentric conductor system in which an inner conductor is surrounded by a cylindrical conductor concentric therewith and acting as a return therefor, an electrical arrangement for association therewith and having the properties of an inductance in series with a capacity, said arrangement including a closed vessel enclosing the ends of the two concentric conductors, the inner conductor being electrically associated with the opposite end of the enclosing vessel, and the other end of said vessel closing on the outer conductor, and a flange on the end of the inner concentric conductor, said flange being parallel with and close to the inner surface of the first mentioned end of said enclosing vessel to form a capacity therewith.

8. In a concentric conductor system in which an inner conductor is surrounded by a cylindrical conductor concentric therewith and acting as a return therefor, an electrical arrangement for association therewith and having the electrical properties of an inductance, said arrangement including a conductive enclosure enclosing said conductors, the outer conductor extending into said enclosure a substantial part of its length, said enclosure having a diameter large as compared with the outer concentric conductor and of length independent of the wave length of the alternating current transmitted, and the interior surface of said enclosure forming a conductive part of the path for the transfer of waves from one conductor to the other, and a resistance connected to one of said concentric conductors.

9. In a concentric conductor system in which an inner conductor is surrounded by a cylindrical conductor concentric therewith and acting as a return therefor, an electrical arrangement for association therewith and having the properties of an inductance and a resistance, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, and a resistance connected to one of said concentric conductors.

10. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, a flange on the end of one of the concentric conductors, said flange being parallel with the first mentioned end of said enclosing vessel and forming a capacity with a nearby conductive surface, and a resistance connected to one of said concentric conductors.

11. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, a flange on the end of the inner concentric conductor, said flange being parallel with the first mentioned end of said enclosing vessel and forming a capacity with a nearby conductive surface, and a resistance connected to one of said concentric conductors.

12. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, a flange on the end of one of the concentric conductors, said flange being parallel with and close to the inner surface of the first mentioned end of said enclosing vessel to form a capacity therewith, and a resistance connected to one of said concentric conductors.

13. In a concentric conductor system in which an inner conductor is surrounded by a cylindrical conductor concentric therewith and acting as a return therefor, an electrical arrangement for association therewith and having the properties of a resistance associated with a series combination of inductance and capacity, said arrangement including a closed vessel enclosing the ends of the two concentric conductors, the outer conductor extending into said enclosure a substantial part of its length, the inner conductor being electrically associated with the opposite end of the enclosing vessel, and the other end of said vessel closing on the outer conductor, a flange on the end of the inner concentric conductor, said flange being parallel with and close to the inner surface of the first mentioned end of said enclosing vessel to form a capacity therewith, and a resistance connected to one of said concentric conductors.

14. In a concentric conductor system in which an inner conductor is surrounded by a cylindrical conductor concentric therewith and acting as a return therefor, an electrical arrangement for association therewith and having the electrical properties of an inductance and capacity, said arrangement including a conductive enclosure enclosing said conductors, said enclosure having a length independent of the wave length of the alternating current transmitted and radial dimensions which are effectively a submultiple of the wave length, and the interior surface of said enclosure forming a conductive path for the transfer of wave energy from one conductor to the other.

15. In a concentric conductor system in which an inner conductor is surrounded by a cylindrical conductor concentric therewith and acting as a return therefor, an electrical arrangement for association therewith and having the electrical properties of an inductance and capacity, said arrangement including a conductive enclosure enclosing said conductors, said enclosure having a length independent of the wave length of the alternating current transmitted and radial dimensions which are effectively equal to one-half of the wave length, and the interior surface of said enclosure forming a conductive path for the transfer of wave energy from one conductor to the other.

16. In a concentric conductor system in which an inner conductor is surrounded by a cylindrical conductor concentric therewith and acting as a return therefor, an electrical arrangement for association therewith and having the properties of an inductance and capacity, said arrangement including a closed vessel enclosing the ends of the two concentric conductors, the inner conductor being electrically associated with the opposite end of the enclosing vessel, and the other end of said vessel closing on the outer conductor, said vessel having a length independent of the wave length of the alternating current transmitted and radial dimensions which are effectively a submultiple of the wave length, and the interior surface of said vessel forming a conductive path for the transfer of wave energy from one conductor to the other.

17. In a concentric conductor system in which an inner conductor is surrounded by a cylindrical conductor concentric therewith and acting as a return therefor, an electrical arrangement for association therewith and having the properties of an inductance and capacity, said arrangement including a closed vessel enclosing the ends of the two concentric conductors, the inner conductor being electrically associated with the opposite end of the enclosing vessel, and the other end of said vessel closing on the outer conductor, said vessel having a length independent of the wave length for the alternating current transmitted and radial dimensions which are effectively equal to one-half of the wave length, and the interior surface of said vessel forming a conductive path for the transfer of wave energy from one conductor to the other.

18. In a concentric conductor system in which an inner conductor is surrounded by a cylindrical conductor concentric therewith and acting as a return therefor, an electrical arrangement for association therewith and having the properties of a plurality of resonant circuits each comprising inductance and capacity, said arrangement including a plurality of closed circular cylindrical vessels the radial dimensions of which are large compared to their length and effectively equal to one-half wave length of the alternating current transmitted.

19. In a concentric conductor system in which an inner conductor is surrounded by a cylindrical conductor concentric therewith and acting as a return therefor, an electrical arrangement for association therewith and having the properties of an inductance and a capacity, said arrangement including a closed vessel enclosing the ends of the two concentric conductors, the inner conductor being electrically associated with the opposite end of the enclosing vessel, and the other end of said vessel closing on the outer conductor, and a flange on the end of the outer concentric conductor, said flange being parallel with the first mentioned end of said enclosing vessel and forming a capacity with a nearby conductive surface.

20. In a concentric conductor system in which an inner conductor is surrounded by a cylindrical conductor concentric therewith and acting as a return therefor, an electrical arrangement for association therewith and having the properties of a combination of inductance and capacity in parallel, said arrangement including a closed vessel enclosing the ends of the two concentric conductors, the inner conductor being electrically associated with the opposite end of the enclosing vessel, and the other end of said vessel closing on the outer conductor, and a flange on the end of the outer concentric conductor, said flange being parallel with and close to the inner surface of the first mentioned end of said enclosing vessel to form a capacity therewith.

21. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the inner conductor being electrically associated with the opposite end of the enclosing vessel, and the other end of said vessel closing on the outer conductor, a flange on the end of the outer concentric conductor, said flange being parallel with the first mentioned end of said enclosing vessel and forming a capacity with a nearby conductor, and a resistance connected to one of said concentric conductors.

22. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the inner conductor being electrically associated with the opposite end of the enclosing vessel, and the other end of said vessel closing on the outer conductor, a flange on the end of the outer conductor, said flange being parallel with and close to the inner surface of the first mentioned end of said enclosing vessel to form a capacity therewith, and a resistance connected to one of said concentric conductors.

23. In a concentric conductor system in which an inner conductor is surrounded by a cylindrical conductor concentric therewith and acting as a return therefor, an electrical arrangement for association therewith and having the properties of an inductance and a resistance, said arrangement including a closed vessel enclosing the ends of the two concentric conductors, the inner conductor being electrically associated with the opposite end of the enclosing vessel, and the other end of said vessel closing on the outer conductor, and a cylindrical resistance element concentric with and surrounding a part of the inner conductor and in electrical connection with the outer concentric conductor.

24. In a concentric conductor system in which an inner conductor is surrounded by a cylindrical conductor concentric therewith and acting as a return therefor, an electrical arrangement for association therewith and having the properties of an inductance and a resistance, said arrangement including a closed vessel enclosing the ends of the two concentric conductors, the inner conductor being electrically associated with the opposite end of the enclosing vessel, and the other end of said vessel closing on the outer conductor, and a cylindrical resistance element concentric with said concentric conductors and in electrical connection with both the inner and outer conductors.

25. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the inner conductor being electrically associated with the opposite end of the enclosing vessel, and the other end of said vessel closing on the outer conductor, a flange on the end of one of the concentric conductors, said flange being parallel with the first mentioned end of said enclosing vessel and forming a capacity with a nearby conductive surface, and a cylindrical resistance element concentric with said concentric conductors and in electrical connection with both the inner and outer conductors.

26. In a concentric conductor system in which an inner conductor is surrounded by a cylindrical conductor concentric therewith and acting as a return therefor, an electrical arrangement for association therewith and having the properties of an inductance, capacity and resistance, said arrangement including a closed vessel enclosing the ends of the two concentric conductors, the inner conductor being electrically associated with the opposite end of the enclosing vessel, and the other end of said vessel closing on the outer conductor, a flange on the outer concentric conductor, said flange being parallel with the first mentioned end of said enclosing vessel and forming capacity with a nearby conductive surface, and a cylindrical resistance element concentric with said concentric conductors and in electrical connection with both the inner and outer conductors.

27. In a concentric conductor system in which an inner conductor is surrounded by a cylindrical conductor concentric therewith and acting as a return therefor, an electrical arrangement for association therewith and having the electrical properties of an inductance and capacity, said arrangement including a conductive enclosure surrounding said conductors, said enclosure having a length independent of the wave length of the alternating current transmitted and radial dimensions which are effectively equal to one-fourth of the wave length, and the interior surface of said enclosure forming a conductive path for the transfer of wave energy from one conductor to the other.

28. In a concentric conductor system in which an inner conductor is surrounded by a cylindrical conductor concentric therewith and acting as a return therefor, an electrical arrangement for association therewith and having the properties of an inductance and capacity, said arrangement including a closed vessel enclosing the ends of the two concentric conductors, the inner conductor being electrically associated with the opposite end of the enclosing vessel, and the other end of said vessel closing on the outer conductor, said vessel having a length independent of the wave length for the alternating current transmitted and radial dimensions which are effectively equal to one-fourth of the wave length, and the interior surface of said vessel forming a conductive path for the transfer of wave energy from one conductor to the other.

29. In a concentric conductor system in which an inner conductor is surrounded by a cylindrical conductor concentric therewith and acting as a return therefor, an electrical arrangement for association therewith and having the properties of a plurality of resonant circuits each comprising inductance and capacity, said arrangement including a plurality of closed circular cylindrical vessels the radial dimensions of which are large compared to their lengths and effectively equal to one-fourth wave length of the alternating current transmitted.

30. In a concentric conductor system in which an inner conductor is surrounded by a cylindrical conductor concentric therewith and acting as a return therefor, an electrical arrangement for association therewith having the properties of an inductance shunted by a capacity, said arrangement including one end wall of an enclosing vessel electrically connected to the inner concentric conductor, a conductive surface associated with the outer concentric conductor parallel to said end wall and sufficiently close thereto to form said capacity, an outer wall of said vessel electrically connected to said outer concentric conductor and the inner conductive surface of said vessel forming a conductive part of the path for the transfer of wave energy from one conductor to the other to form an inductance in parallel to said capacity.

31. In a transmission system in which a transmission conductor is surrounded by a hollow member of conductive material separated from said conductor by dielectric material, an electrical arrangement for association therewith and having reactive properties, said arrangement including a conductive enclosure surrounding a part of said conductor and electrically associated with said hollow member, said enclosure having a cross-dimension materially different in magnitude from the corresponding cross-dimension of said hollow member and having a length independent of the wave length of the alternating current transmitted.

32. In a concentric conductor system in which an inner conductor is surrounded by a cylindrical conductor concentric therewith and acting as a return therefor, an electrical arrangement for association therewith and having the electrical properties of a series lumped inductance, said arrangement including a conductive enclosure concentrically surrounding the two concentric conductors, both of said conductors extending within said enclosure at least almost its entire length, the one end of the enclosure being connected to the inner conductor and the other end being connected to the outer conductor.

33. In a conductor system in which an inner conductor is surrounded by a cylindrical conductor acting as a return therefor, an electrical arrangement for association therewith and having the properties of an inductance, said arrangement including a closed vessel enclosing the ends of the two conductors, both of said conductors extending at least almost the entire length of said closed vessel, the inner conductor being electrically associated with the opposite end of the enclosing vessel and the other end of said vessel closing on the outer conductor.

34. In combination, a concentric conductor pair, a coaxial cylindrical vessel with closed end walls surrounding both conductors of said pair, said concentric conductor pair extending into said surrounding vessel a substantial part of its length, one end wall of said vessel having close conductive fit around the outer conductor of said pair, and reactance means located within the closed vessel close to its opposite end wall.

35. In combination, a concentric conductor pair, a coaxial cylindrical vessel with closed end walls surrounding both conductors of said pair, said concentric conductor pair extending into said surrounding vessel a substantial part of its length, one end wall of said vessel having close conductive fit around the outer conductor of said pair, and the inner conductor having electrically continuous connection to the opposite end wall of said vessel so that currents may flow solely along said opposite end wall and back over the side walls of said vessel to said outer conductor.

36. In combination, a concentric conductor pair, a coaxial cylindrical vessel with closed end walls surrounding both conductors of said pair, said concentric conductor pair extending into said surrounding vessel a substantial part of its length, one end wall of said vessel having electrically continuous connection around the outer conductor of said pair, and the inner conductor having electrically continuous connection to the opposite end wall of said vessel so that currents may flow solely along said opposite end wall and back over the side walls of said vessel to said outer conductor.

37. The combination of claim 1 characterized by the fact that the length of the uncovered portion of the inner conductor within the tank is adjustable.

38. The combination of claim 3 characterized by the fact that the length of the uncovered portion of the inner conductor within the tank is adjustable.

39. The combination of claim 36 characterized by the fact that the length of the uncovered portion of the inner conductor within the tank is adjustable.

RALPH KIMBALL POTTER.